United States Patent
Muller

[11] 3,714,975
[45] Feb. 6, 1973

[54] CONNECTING LINK FOR TIRE ANTI-SKID CHAINS

[75] Inventor: Anton Muller, Unterkochen/Wurttemburgh, Germany

[75] Assignee: Pistor-Kette GmbH, Wuppertal-Cronenberg, Germany

[22] Filed: Sept. 28, 1970

[21] Appl. No.: 75,925

[30] Foreign Application Priority Data

Sept. 26, 1969 Germany...................P 19 48 718.4

[52] U.S. Cl..................................................152/243
[51] Int. Cl.......................................B60c 25/04
[58] Field of Search.................................152/243

[56] References Cited

UNITED STATES PATENTS 2,431,981  12/1947  Asbury...........................152/243

FOREIGN PATENTS OR APPLICATIONS 551,466  12/1959  Belgium.........................152/243
87,585   4/1956   Norway..........................152/243

Primary Examiner—James B. Marbert
Attorney—Walter Becker

[57] ABSTRACT

A connecting link member for an anti-skid chain for tires in which the link member has a recess to receive chain links and an opening in one side of the link member giving access to the recess. A closure member in the form of two jaws is clamped into said opening with the jaws in opposed relation and traversed by a clamping bolt. The closure member includes a portion extending across said recess to the other side of the link member and dividing the recess into two parts each adapted to receive a respective chain link.

10 Claims, 8 Drawing Figures

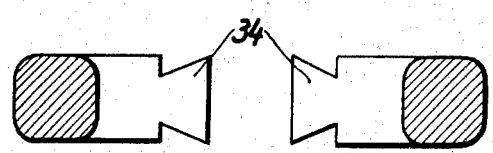
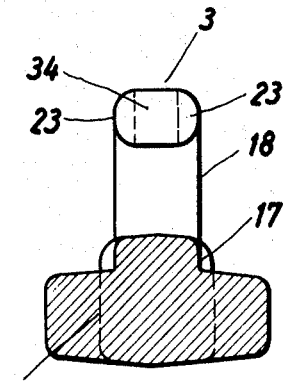
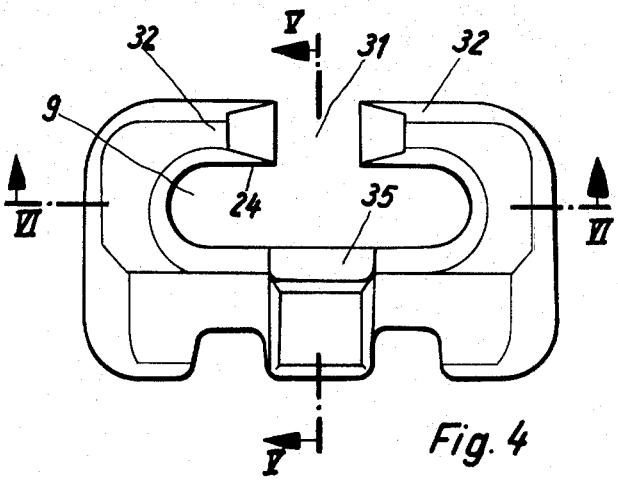
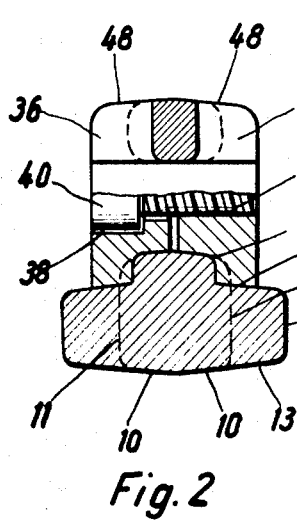
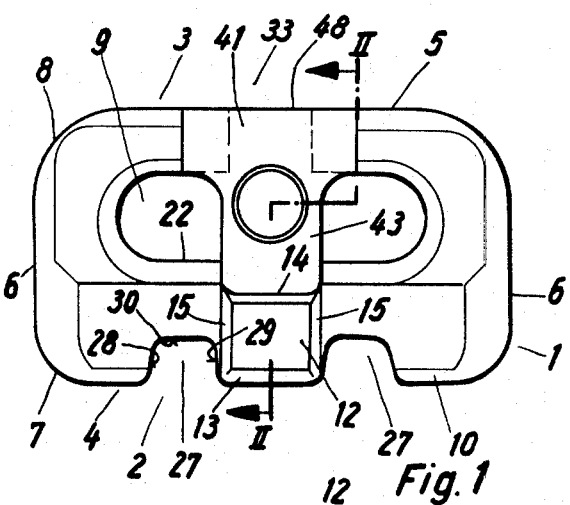
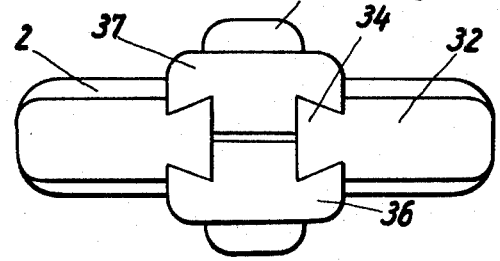

CONNECTING LINK FOR TIRE ANTI-SKID CHAINS

The present invention concerns a connecting link for anti-skid chains for tires, especially a web-shaped double-hooked link with at least one receiving opening for the links to be interconnected and with an insert opening which leads into the receiving opening and is defined by two link legs arranged in spaced relationship to each other, said insert opening being adapted to be closed by closure member.

It is an object of this invention to provide a connecting link of the above mentioned type which will have an improved strength while being simple in construction.

This object and other objects and advantages of the invention will appear more clearly from the following specification in connection with the accompanying drawings, in which:

FIG. 1 is a side view of a connecting link according to the present invention.

FIG. 2 is a section taken along the line II—II of FIG. 1.

FIG. 3 is a top view of the link according to FIG. 1.

FIG. 4 shows a side view of the link of FIG. 1 but without the closure member.

FIG. 5 is section taken along the line V—V of FIG. 4.

FIG. 6 is a section taken along the line VI—VI of FIG. 4.

Figure 7:
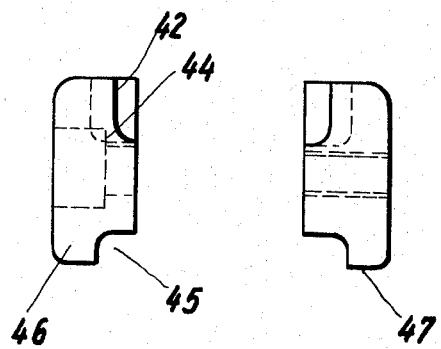
FIG. 7 shows a view of the two closing jaws of the closing member according to FIG. 1 as seen from the right-hand side of the drawing.

The connecting link according to the present invention is characterized primarily in that the closing member, which perpendicularly to the central plane of the link, has two jaws adapted to be clamped toward each other and that the said closing member extends at both sides around the link legs which define the insert opening, and furthermore characterized in that the said jaws, which preferably are formed by separate parts, are adapted to be clamped against the lateral surfaces of said link legs. A design of this type results in increased strength of the closed connecting link. The two jaws may in a simple manner be formed by separate parts.

A considerable increase in the strength of the connecting link is due to the fact that the closure member extends preferably in a positive manner around the link legs which define the insert opening. Expediently, the link web, which is located opposite the insert opening, is at both sides provided preferably with groove-like depressions for engagement by the closing member so that the latter will be precisely fixed in its assembled position and cannot be displaced accidentally. Advantageously, the said depressions end in spaced relationship to the outer surface of that link web which faces away from the insert opening so that when the connecting link is designed for instance as a web-like running link of a tire protective anti-skid chain, a wear of the closing member during the wear of the running web, which is located opposite the insert opening, will be avoided.

Particularly when employing the connecting link according to the invention as a running link of a tire anti-skid chain, it is also expedient to have the closing member extend around the inner surface of that link web which is located opposite to the insert opening because in such an instance the closing member will form a transverse central web of the connecting link, which transverse central web supports the running web with regard to the tire abutment web which has the insert opening.

According to a simple embodiment of the link according to the invention, the link comprises a preferably oblong receiving opening which is sub-divided into two individual openings by the closing member.

For purposes of obtaining a particularly safe mounting of the closing member at the ends of the web legs, the latter have their ends designed in the manner of a dovetail while preferably the longitudinal central planes of said dovetails are located in the central plane of the link.

In order to prevent a displacement of the closing member parallel to the longitudinal central plane of the connecting link and perpendicularly with regard to the longitudinal direction of the link legs, those counter elements associated with the link legs and pertaining to the closing member have abutment surfaces supported at the inner surfaces of the link legs.

For further simplifying the handling of the connecting link according to the present invention, the jaws are by means of a bolt, preferably a countersunk screw bolt, adapted to be adjusted relative to each other. Said screw bolt is, for purposes of securing a space saving and safe mounting, arranged approximately symmetrically with regard to the central plane of the insert opening, preferably within the region of the receiving opening, and may have a diameter which is smaller than the width of the insert opening.

A substantial increase in the strength of the connecting link according to the invention may also be obtained by having the closing member exceeded as to height laterally by extensions which are provided on the lateral surfaces of the link web which is located opposite to the insert opening. Furthermore, the closing member has its pertaining end faces in engagement with said extensions.

Referring now to the drawings in detail and FIGS. 1 to 6 thereof in particular, the connecting link 1 shown therein is a drop-forged element which has substantially the shape of a flat web while comprising two longitudinal webs 2, 3 which form the longitudinal edge surfaces 4, 5 of the web link 1. These longitudinal edge surfaces 4, 5 merge through rounded portions 7, 8 with the end edge surfaces 6 while between the longitudinal webs 2, 3 there is provided an oblong receiving opening 9.

The longitudinal edge surface 4 of the connecting link 1 forming a running link is designed as running surface and comprises two individual surfaces 10 which with the longitudinal plane of the link 1 define an obtuse angle. The substantially plane parallel side surfaces 11 of the running web 2 comprising the running surface 4 and pertaining to the connecting link 1 are, in the center of the length of said connecting link 1, provided with two extensions 12 which laterally protrude and which, according to the side view of FIG. 1, are of an approximately square shape. The circumferential surfaces 13–15 of the extensions 12 extend toward the end surface 16 at a small angle while at the same time extending toward each other. The distance of the lateral surfaces 16 of the two extensions 12 from each other is approximately twice as great as the cross-sectional width of the running web 2 in the remaining range, as measured perpendicularly with regard to the longitudinal central plane. The extensions 12 from the running surface 4 extend only over a portion of the cross-sectional height of the running web 2 and through the intervention of sharply springing-in edges 17 merge with the side surfaces 18 of that section of the connecting link 1 which comprises the receiving opening 9.

The running web 2, which cross section-wise is substantially square shape, merges through roundings 21 with the approximately plane inner surface 22 of the receiving opening 9, which inner surface is located toward the running surface 4 and approximately parallel thereto. The length of said receiving opening 9 corresponds approximately to two-thirds of the length of the link while said receiving opening 9 has its ends rounded semi-circularly.

At both sides of the extensions 12 in the running surface 4 of the running web 2 there are provided groove-like depressions 27 the side surfaces of which converge toward the running surface 4 while the bottom surfaces 30 extend in the longitudinal direction of the web member 1. The lateral surfaces 29 are so designed as to directly merge with the lateral circumferential surfaces 15.

The abutment web 3, which forms the tire-engaging surface 5, has an insert opening 31 which is divided at both sides by two web legs 32 protruding freely toward each other and can be introduced by the links into the receiving opening 9. The insert opening 31 can be closed by a closure member 33.

The ends of the web legs 32 are formed by dovetails 34, the central plane of which is located in the central plane of the connecting link 1. The ends of said web legs 32 are embraced by the closure member 33 in a positive manner. At both side surfaces 11 of the running web 2 and located opposite to the insert opening 31, there are provided between the extension 12 and the inner surface 22 groove-shaped recesses 35 the width of which corresponds approximately to the extension of the extensions 12 in the longitudinal direction of the connecting link 1.

The closure member 33 has two jaws 36, 37 which are formed by separate parts. The dividing plane of jaws 36, 37 is located along the longitudinal central plane of the connecting link 1 while the outer shape of said jaws is substantially the same. The two jaws 36, 37 differ from each other merely in that the jaw 36 has a countersunk passage 38 for a screw bolt 40, whereas the jaw 37 is provided with an inner threaded bore 39 for said screw bolt. The two jaws 36, 37 are, when viewed from the side, of a T-shape in conformity with FIG. 1, while the T-webs 41 at the ends of said T-webs 41 have those inner sides which face each other provided with one-half of dovetail shape openings 42 which correspond to the dovetails 34 and extend in a positive manner therearound. The dovetail openings 42 extend only approximately to the merging area of the T-foot web 43 with the T-transverse webs 41 so that the recesses 42 form face adjacent abutment surfaces 44 which engage the inner surface of the web legs 32.

The free ends of the T-foot webs 43 have the inner surfaces thereof which face each other provided with annular recesses 45 in such a way that the T-foot webs extend around the lateral surfaces as well as the inner surfaces 22. The end sections 46, which pertain to the foot webs 43 and are tapered in view of the recesses 45, positively engage the grooves 35. The end faces 47 of these end sections rest against the inclined circumferential surfaces 14 of the extensions 12, so that the jaws 36, 37 when being clamped together by means of bolt 40 will also, parallel to the longitudinal central plane of link 1 and vertically with regard to the webs 2, 3, be clamped between said webs 2, 3. Said end faces 47 rest against those inclined circumferential surfaces 14 which face the receiving opening 9. The clamping bolt 40 is mounted in the T-foot webs 43 of the jaws 36, 37 and is located within the region of the receiving opening 9 while its diameter is shorter than the width of the insert opening 31.

Whereas, the extensions 12 form widened portions 13 of the running surface 4 of link 1, which widened portions 13 laterally protrude beyond the closure member 33, those outer surfaces 48 of the two jaws 36, 37 which face away from said widened portions 13 form a widened portion of said tire-engaging surface, said jaws 36, 37 being located in the tire-engaging surface 5 of web 3.

As will be seen in particular from FIG. 5, the distance between the lateral surfaces 18 of the web link is less than the distance of the lateral surfaces 11 of the running web from each other and equals the distance between the lateral surfaces 23 of the abutment web 3. The abutment web 3 has approximately rectangular cross sections. The height of the cross section of the abutment web 3 amounts to only approximately one-third of the cross-sectional height of the running web 2.

Figure 8:
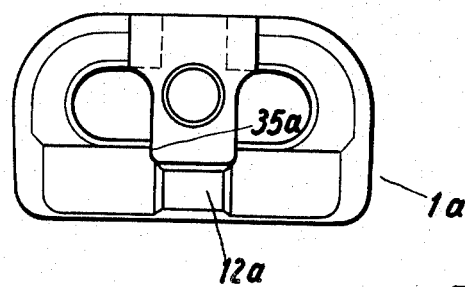
FIG. 8 represents a further embodiment of a link according to the present invention in a view similar to that of FIG. 1.

According to the embodiment of FIG. 8, the extensions 12a are longitudinally rectangular in the longitudinal direction of the connecting link 1a while the width of the grooves 35a is somewhat greater than the corresponding extension of the extensions 12a.

It is, of course, to be understood that the present invention is, by no means, limited to the particular showing in the drawings, but also comprises any modifications within the scope of the appended claims.

What is claimed is:

1. A connecting link for anti-skid chains for tires, especially a double hook link adapted to be employed as a running link and comprising: a link member having ends with inclined faces respectively at boundary location thereof and sides and at least one recess for receiving chain link means, a slot-like opening leading into said recess from one side of the link member for insertion and removal of said chain link means, and closure means for closing said opening to lock said chain link means in said recess, said closure means comprising a pair of jaw members engaging to complement opposite inclined faces of said link member in an inclined mating clamp force interface relationship adjacent said slot-like opening, and means fixedly clamping said jaw member together.

2. A connecting link according to claim 1 in which said closure means includes a portion extending from the side of the link member having said opening therein to the other side of the link member, said other side of said link member having notches in the opposite faces thereof, and said portion of said closure means having end parts seated in said notches.

3. A connecting link according to claim 2 in which each jaw member has a respective part of said portion and a said end part thereon, each said end part extending from the outer region of the respective part of said portion whereby said end parts and said parts of said portions define a recess opening toward and adapted to receive said other side of said link member.

4. A connecting link according to claim 1 in which said recess is elongated in a direction parallel to the sides of said link and said opening is in about the middle of the length of said recess, said jaw members each comprising a portion extending laterally across said recess to the other side of said link member and embracing said other side of said link member and subdividing said recess into two sections each of which is adapted to receive a respective chain link.

5. A connecting link according to claim 4 in which the faces of said link member at opposite boundary sides of said opening are formed by freely projecting ends with dovetails thereon, said jaw members at the ends thereof overlying said dovetails and having complementary configurations, each said dovetail having opposite surfaces which converge in a direction away from said opening, and said jaw members including abutment surfaces to abut the ends of said dovetails which face each other.

6. A connecting link according to claim 5 which includes a bolt connecting said jaw members, said bolt having a diameter smaller than the said opening, said bolt disposed in said jaw members in about the central plane of said opening and within the range of said recess.

7. A connecting link according to claim 6 in which said jaw members are T-shaped when viewed in a direction perpendicular to one face of said link member, the ends of the transverse bar portion of said jaw members positively engaging opposite faces of said link member adjacent said opening, said jaw members when viewed from the side of said link member having said opening therein presenting a widened region toward the said one side of the link.

8. A connecting link for anti-skid chains for tires, especially a double hook link adapted to be employed as a running link and comprising: a link member having ends and sides and at least one recess for receiving chain link means, a slot-like opening leading into said recess from one side of the link member for insertion and removal of said chain link means, and closure means for closing said opening to lock said chain link means in said recess, said closure means comprising a pair of jaw members engaging opposite faces of said link member adjacent said slot-like opening, and means fixedly clamping said jaw members together, said recess being elongated in a direction parallel to the sides of said link and said opening being in about the middle of the length of said recess, said jaw members each comprising a portion extending laterally across said recess to the other side of said link member and embracing said other side of said link member and subdividing said recess into two sections each of which is adapted to receive a respective chain link, the faces of said link member at opposite sides of said opening being formed with dovetails thereon, said jaw members at the ends thereof overlying said dovetails and having complementary configurations, each said dovetail having opposite surfaces which converge in a direction away from said opening, and said jaw members including abutment surfaces to abut the ends of said dovetails which face each other, a bolt connecting said jaw members, said bolt having a diameter smaller than the said opening, said bolt being disposed in said jaw members in about the central plane of said opening and within the range of said recess, said jaw members being T-shaped when viewed in a direction perpendicular to one face of said link member, the ends of the transverse bar portion of said jaw members positively engaging opposite faces of said link member adjacent said opening, said jaw members when viewed from the side of said link member having said opening therein presenting a widened region toward the said one side of the link, the opposite faces of said link member on the side of said link member opposite the side thereof having said opening therein comprise lateral projections protruding outwardly beyond the outer faces of said jaw members, said projections engaging the adjacent ends of the vertical bar portions of said jaw members, said projections extending longitudinally of said link member at least over the same range as the said adjacent ends of said vertical bar portions of said jaw members.

9. A connecting link according to claim 1 in which each boundary location of the opening at a time on both sides of said link member has an inclined clamping surface therewith and that both clamping surfaces are formed by dovetail configuration of said link member.

10. A connecting link according to claim 9 in which greatest width of said link member is approximately so great as thickness of said link member in range of the opening.

* * * * *